United States Patent
Wang

(10) Patent No.: US 10,056,113 B2
(45) Date of Patent: Aug. 21, 2018

(54) VIDEO PROCESSING METHOD AND ASSOCIATED ELECTRONIC DEVICE

(71) Applicant: Tencent Technology (Shenzhen) Company Limited, Shenzhen, Guangdong (CN)

(72) Inventor: Wentao Wang, Guangdong (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 15/441,996

(22) Filed: Feb. 24, 2017

(65) Prior Publication Data

US 2017/0169856 A1 Jun. 15, 2017

Related U.S. Application Data

(63) Continuation of application No. PCT/CN2015/088413, filed on Aug. 28, 2015.

(30) Foreign Application Priority Data

Aug. 29, 2014 (CN) .......................... 2014 1 0436696

(51) Int. Cl.
*H04N 5/783* (2006.01)
*G11B 27/10* (2006.01)
(Continued)

(52) U.S. Cl.
CPC .......... *G11B 27/10* (2013.01); *G06F 17/3082* (2013.01); *G06F 17/30846* (2013.01);
(Continued)

(58) Field of Classification Search
CPC ...... G11B 27/10; G11B 27/005; H04N 5/775; G06F 17/30846; G06F 17/30858; G06F 17/3082
(Continued)

(56) References Cited

U.S. PATENT DOCUMENTS 8,737,821 B2 5/2014 Li
2011/0150421 A1* 6/2011 Sasaki ................ G11B 27/3027
386/241

(Continued)

FOREIGN PATENT DOCUMENTS

CN 103581764 A 2/2014
CN 103716703 A 4/2014
CN 103986962 A 8/2014

OTHER PUBLICATIONS

First Chinese Office Action regarding Application No. 201410436696.2 dated May 3, 2017.
(Continued)

*Primary Examiner* — Robert Chevalier
(74) *Attorney, Agent, or Firm* — Harness, Dickey & Pierce, P.L.C.

(57) ABSTRACT

Described is a method for video processing. The method comprises: providing one display interface, where a page is displayed on the display interface, and the page comprises a page having a video playback area; playing a video on the page having the video playback area and acquiring a first instruction during video playback, where the first instruction is used for creating a video playback window on the display interface, and the first instruction at least comprises a uniform resource locator (URL) of the page on which the video is played; creating the video playback window according to the first instruction; pausing playback of the video on the page; logging the progress of the video when playback of the video is paused as a first progress; and, with the first progress as playback starting point for the video, playing same on the video playback window.

19 Claims, 5 Drawing Sheets obtaining a first instruction, where the first instruction is configured to create a video playback window, and includes at least a URL of a page on which the video is played — 101 suspending the video which is played on the page at a first progress, creating the video playback window, based on the first instruction, obtaining the corresponding video playback data, based on the URL and the information of the first progress, and controlling the video playback window to play the corresponding video, based on the obtained video playback data — 102

(51) Int. Cl.
*H04N 5/775* (2006.01)
*G11B 27/00* (2006.01)
*G06F 17/30* (2006.01)

(52) U.S. Cl.
CPC ...... *G06F 17/30858* (2013.01); *G11B 27/005* (2013.01); *H04N 5/775* (2013.01)

(58) Field of Classification Search
USPC ........ 386/343, 344, 291, 323, 351, 349, 353
See application file for complete search history.

(56) References Cited

U.S. PATENT DOCUMENTS

2015/0215357 A1    7/2015  Lu
2016/0119764 A1*  4/2016  Grange ................ H04W 4/003
                                                    455/411

OTHER PUBLICATIONS

International Search Report of the ISA for PCT/CN2015/088413, Haidian District, Beijing, dated Dec. 16, 2015.

* cited by examiner

VIDEO PROCESSING METHOD AND ASSOCIATED ELECTRONIC DEVICE

CROSS REFERENCE TO RELATED APPLICATION

This application is a continuation of International Application No. PCT/CN2015/088413, filed on Aug. 28, 2015, which claims the priority to Chinese Patent Application No. 201410436696.2, filed on Aug. 29, 2014, both of which are hereby incorporated by reference in their entireties.

TECHNICAL FIELD

The present disclosure relates to the technical field of video playback, and in particular to a video processing method and associated devices.

BACKGROUND

When a user watches a video shown on a page of a browser through a device, other contents such as comments of the video and relevant information of the video usually needs to be browsed at the same time, hence an up-down slide operation on content of the page usually needs to be implemented. The up-down slide operation changes a visible region of the page, causing that a video playback region in the page is removed out of the visible region of the page (that is, the visible region of the page no longer includes a complete video playback region). The browser can not continue providing a normal video playback for the user, when the video playback region in the page is removed out of the visible region of the page, thus causing that the user's watching the video is interrupted. In addition, when the user watches a video on a page (such as page A) through a device, if content on another page (such as page B) needs to be browsed, browsing another page (such as page B) may also cause that the browser can not continue providing the normal video playback (namely, a video playback on page A) for the user, thus causing that the user's watching the video is interrupted.

SUMMARY

A method for video processing is provided according to embodiments of the disclosure, which is executed in an electronic device. The electronic device includes a memory, one or more processors and program instructions stored in the memory and processed by the one or more processors. The method includes: providing a display interface, where pages are displayed on the display interface, and the pages includes a page having a video playback region; playing a video on the page having the video playback region, and obtaining a first instruction during playing the video, where the first instruction is configured to create a video playback window on the display interface, and includes at least a uniform resource locator URL of the page on which the video is played; creating the video playback window according to the first instruction; suspending a playback of the video on the page; recording a progress of the video where the playback of the video is suspended as a first progress; and playing the video on the video playback window by using the first progress as a starting point for playing the video, based on the URL.

An electronic device is also provided according to embodiments of the present disclosure, which includes a memory and one or more processors. Program instructions are stored in the memory, and when the program instructions is executed by the processor, the electronic device is configured to perform the following operations: providing a display interface, where pages are displayed on the display interface, and the pages includes a page having a video playback region; playing a video on the page having the video playback region, and obtaining a first instruction during playing the video, where the first instruction is configured to create a video playback window on the display interface, and includes at least a uniform resource locator URL of the page on which the video is played; creating the video playback window based on the first instruction; suspending a playback of the video on the page; recording a progress of the video where the playback of the video is suspended as a first progress; and playing the video on the video playback window by using the first progress as a starting point for playing the video based on the URL.

DETAILED DESCRIPTION OF THE EMBODIMENTS

The technical solutions of the disclosure will be further described below in detail in conjunction with drawings and specific embodiments.

In the following detailed description, for ease of understanding, specific details are provided for a complete understanding of embodiments of the disclosure. However, obviously, one or more embodiments without specific details may also be implemented. In other cases, a well-known structure and a well-known device are embodied in a figure so as to simplify the drawings.

A method for video processing is provided according to embodiments of the disclosure, and the method includes: providing a display interface, where pages are displayed on the display interface, and the pages includes a page having a video playback region; playing a video on the page having the video playback region, and obtaining a first instruction during playing the video, where the first instruction is configured to create a video playback window on the display interface, and includes at least a uniform resource locator (URL) of the page on which the video is played; creating the video playback window based on the first instruction; suspending a playback of the video on the page; recording a progress of the video where the playback of the video is suspended as a first progress; and playing the video on the video playback window by using the first progress as a starting point for playing the video based on the URL. With the method, when the video playback region on the page is not suitable for continuing playing the video, an independent video playback window is created for continuing playing the video, hence ensuring that watching the video by the user is not interrupted; and continuing playing the video via the video playback window may not influence an operation on the original video playback page and an operation of creating a new browsing page, hence achieving an effect that the user may watch the video, while browsing the page or performing other operations on the page.

The page may also include a web page. When the user browses the web page, the web page and the video playback window are simultaneously in an interface foreground display state; or in the process of playing the video on the video playback window, if the user browses the page having the video playback region and the video playback region is not in a visible region of the page, the page having the video playback region and the video playback window are simultaneously in a interface foreground display state.

Figure 1:
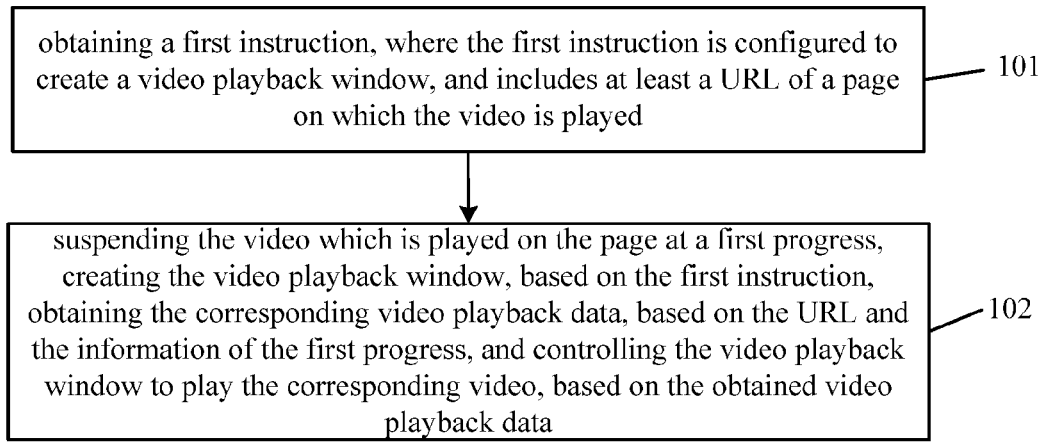
FIG. 1 is a flow chart of a method for video processing according to an embodiment of the disclosure.

FIG. 1 shows a method for video processing according to an embodiment of the disclosure. The method includes steps S101 to S102.

In step S101, a first instruction is obtained, where the first instruction is configured to create a video playback window, and includes at least a URL of a page on which the video is played.

In step S102, the playback of the video on the page is suspended at a first progress, the video playback window is created based on the first instruction, and the video playback window is controlled to play the video based on the URL and information of the first progress.

An electronic device may generate the first instruction, when detecting that the video playback region of the page on which the video is being played is removed out of the visible region of the page; or the electronic device may also generate the first instruction, when detecting that the user performs a first operation on the page where the video is being played; or the electronic device may also generate the first instruction, when detecting that a state of the page where the video is being played changes from the interface foreground display state to a non-interface foreground display state.

According to the embodiment of the disclosure, for example, the area of the video playback window is smaller than the area of the page, and the page and video playback window are simultaneously in the interface foreground display state.

According to the embodiment of the disclosure, the playback of the video can be suspended in the video playback region, and the video starts to be played simultaneously in the video playback window so as to ensure a continuous video playback. Optionally, after a certain period of time when the playback of the video is suspended in the video playback region, the video may start to be played in the video playback window.

According to the embodiment of the disclosure, the operation of closing the page may not cause a close of the video playback window.

According to the embodiment of the disclosure, the first progress is a playback progress of the video on the page when the first instruction is generated.

According to the embodiment of the disclosure, the created video playback window overlaps the page and is not covered by the page, so the user may watch the video in the video playback window. Since the video playback window overlaps the page, the video playback window and the page may be simultaneously in the interface foreground display state, and since the area of the created video playback window is smaller than the area of the visible region of the page, that is to say, at least part of the visible region of the page is not covered by the video playback window, therefore the user may browse a web page normally, while watching the video being played in the video playback window.

Specifically, when the user watches the video being played on the page like the video playback region of the page, some operations may be performed on the page, and the operations of the user may make the video playback region moved and out of the visible region of the page. Therefore, the method for video processing according to the embodiment of the disclosure may detect a relative location between the video playback region and the visible region of the page. When playing the video by the page, if the video playback region is removed out of the visible region of the page, the first instruction is generated by triggering.

According to the embodiment of the disclosure, the first instruction is generated, when the whole video playback region is removed out of the visible region of the page; according to another embodiment of the disclosure, the first instruction is also generated, when a part of the video playback region is removed out of the visible region of the page.

Figure 3A:
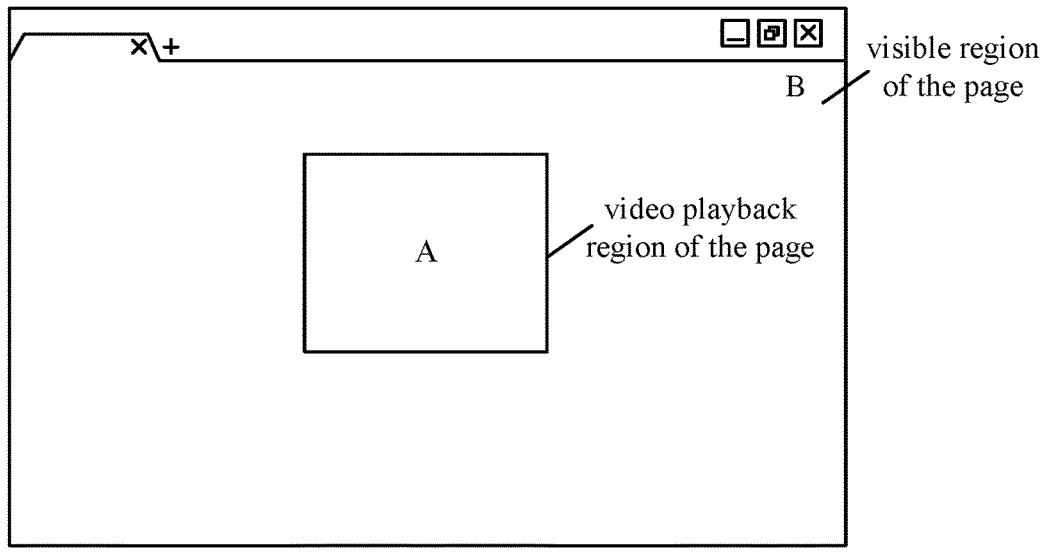
FIG. 3a to FIG. 3c are schematic diagrams of interfaces for video processing according to an embodiment of the disclosure.
Figure 3B:
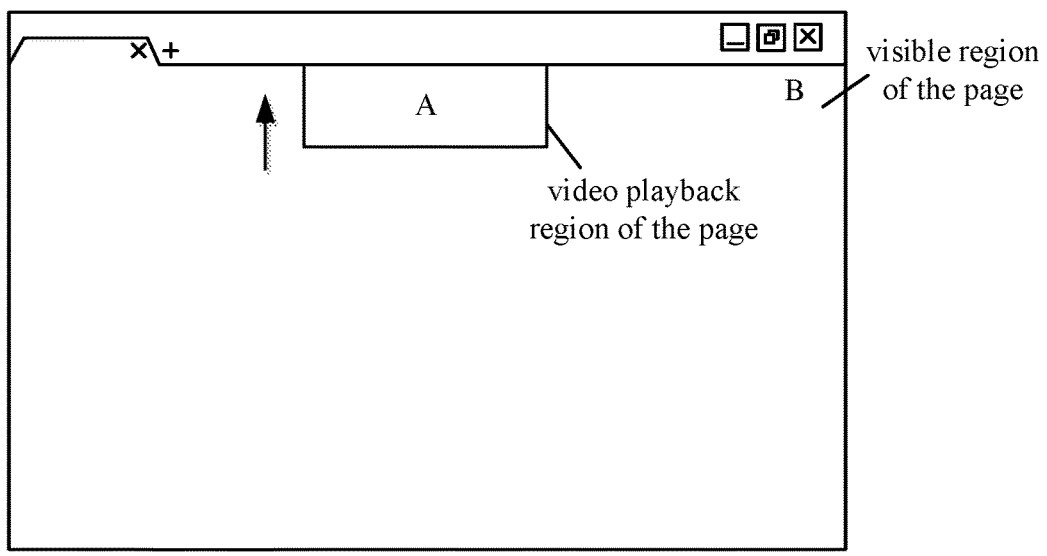

For example, as shown in FIG. 3a, an electronic device is playing a video by using a page, a region on which the video is being played on the page is shown as a region A in the figure, a region B in the figure is a visible region of the page, namely a page region which is visible for the user via a display screen of the electronic device; as shown in FIG. 3b, when the user hopes to browse other contents (such as comments of the video and relevant information of the video) on the page, while watching the video, the user scrolls or slides the page, which makes that the region A where the video is played on the page gradually is removed out of the visible region B of the page, that is, the visible region B of the page no longer includes the complete playback region A; at the moment, the electronic device triggers generating the first instruction and instructs to create a video playback window.

Figure 4A:
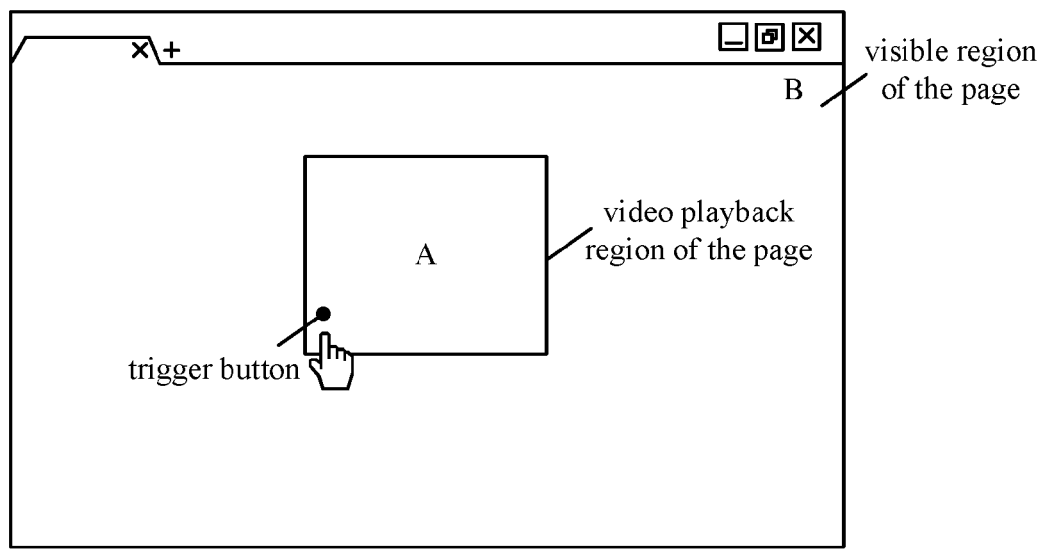
FIG. 4a to FIG. 4b are schematic diagrams of interfaces for video processing according to another embodiment of the disclosure.

According to the embodiment of the disclosure, when playing the video by the page, if a first operation of the user on the page is detected (for example, the user clicks or touches a trigger button on the page), the first instruction is generated by triggering. For example, as shown in FIG. 4a, the electronic device is playing the video by using a page, wherein, the video is in the playback region of the page such as the region A shown in the figure, and the region B is a visible region, namely, a page region which is visible for the user via the display screen of the electronic device. When the user clicks or touches the trigger button on the page, the electronic device may trigger generating the first instruction for creating the video playback window. The trigger button is an operation button for creating the video playback window on the display interface of the electronic device.

Figure 5A:
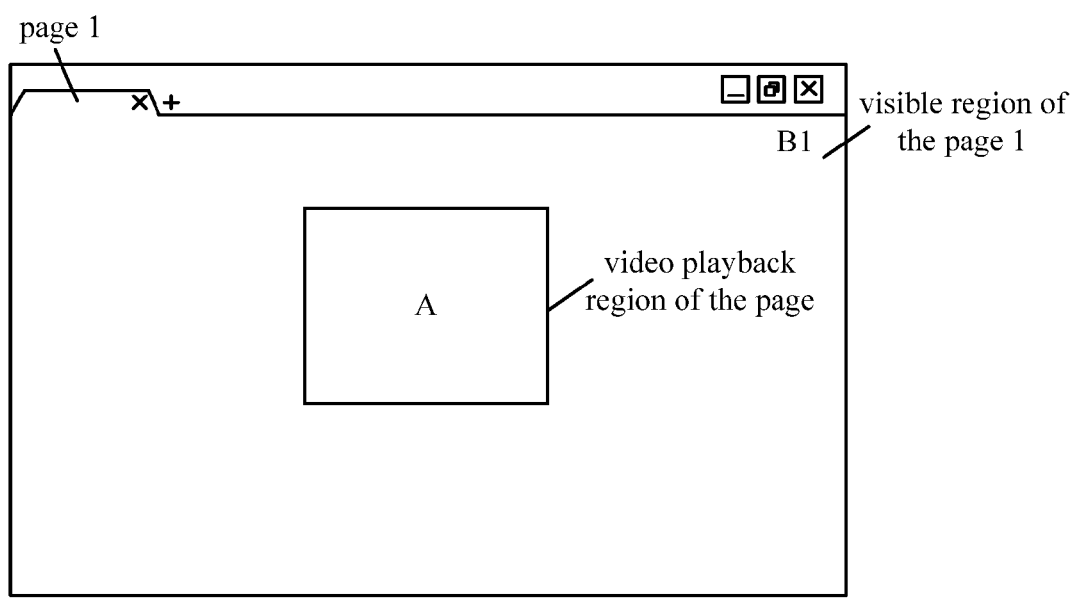
FIG. 5a to FIG. 5b are schematic diagrams of interfaces for video processing according to another embodiment of the disclosure.
Figure 5B:
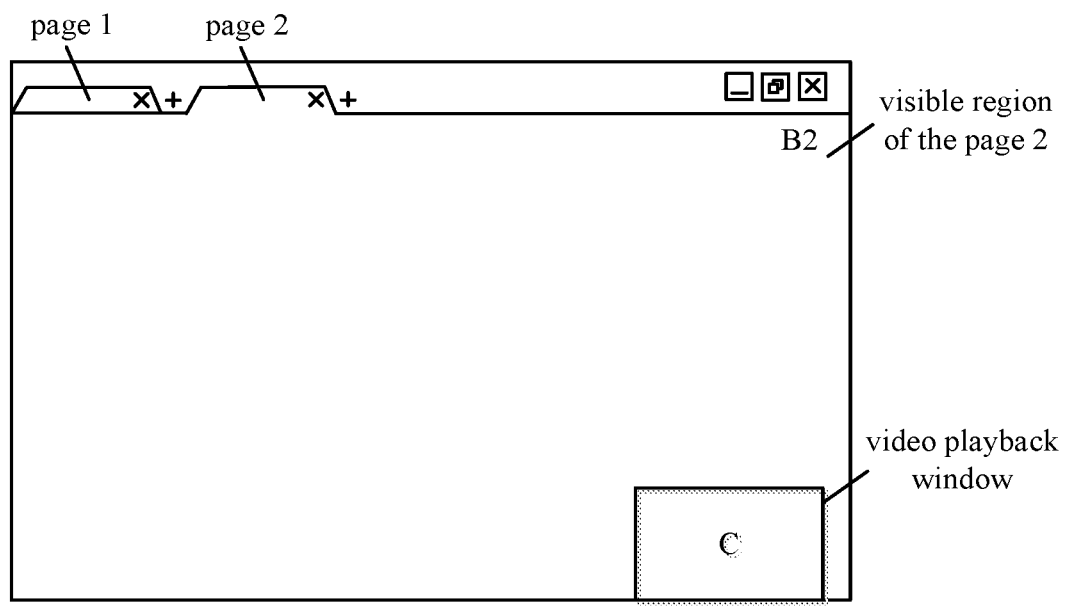

According to the embodiment of the disclosure, when playing the video by the page, if the page is detected that a state of the page is changed from the interface foreground display state to the non-interface foreground display state, the first instruction is generated by triggering. The interface foreground display state refers to that what the display screen of the electronic device currently displays is the content of the page; the non-interface foreground display state refers to that what the display screen of the electronic device currently displays is not the content of the page. For example, as shown in FIG. 5a, the electronic device is playing the video by using a page 1, the video is in the playback region of the page 1 such as the region A shown in the figure, a region B1 in the figure is a visible region of the page 1, namely a page region which is visible for the user via the display screen of the electronic device. As shown in FIG. 5b, when the page 1 plays the video, the user opens a new page 2, and the content displayed on the screen is changed from the content of the page 1 to the content of the page 2, where a region B2 in the figure is a visible region of the page 2. In this case, the electronic device may trigger generating the first instruction for creating the video playback window.

The video playback window is different from a playback window generated by a native video tag in the page, and it is also different from an ordinary flash playback window. The video playback window is different from the video playback window on the page and exists as an independent video playback pattern or an independent video player, and after being generated, the video playback window may not influence an operation on the original video playback page and an operation of creating a new browsing page, hence achieving an effect that the user may watch the video, while browsing the page or performing other operations on the page. The video tag is one kind of tags of hyper text markup language 5 (HTML5) tags, specialized for playing movie clips or other video stream on the page.

The URL in the first instruction indicates a data source address of the video, and the information of the first progress in the first instruction indicates the progress information of the video played by the page, when the first instruction is generated. Certainly, if the page has not started to play the video when the first instruction is generated, the information of the first progress in the first instruction may be also set to null.

The electronic device may suspend the playback of the video on the page at the first progress, and based on the URL and the information of the first progress, control the video playback window to play the corresponding video from the first progress where the playback of the video on the page is suspended, so the video played on the page is smoothly transited to the video played on the video playback window. For example, the electronic device obtains the corresponding video data, based on the URL and the information of the first progress; the electronic device controls the video playback window to play the corresponding video from the first progress where the playback of the video on the page is suspended based on the obtained video data.

According to the embodiment of the disclosure, when the first instruction is generated and obtained, the page corresponding to the URL is controlled to suspend the playback of the video; the video playback window is created, and the corresponding video data are obtained from a web server-side, based on the URL and the information of the first progress; and the video playback window is controlled to play the corresponding video from the first progress where the playback of the video on the page is suspended, according to the obtained video data.

Figure 3C:
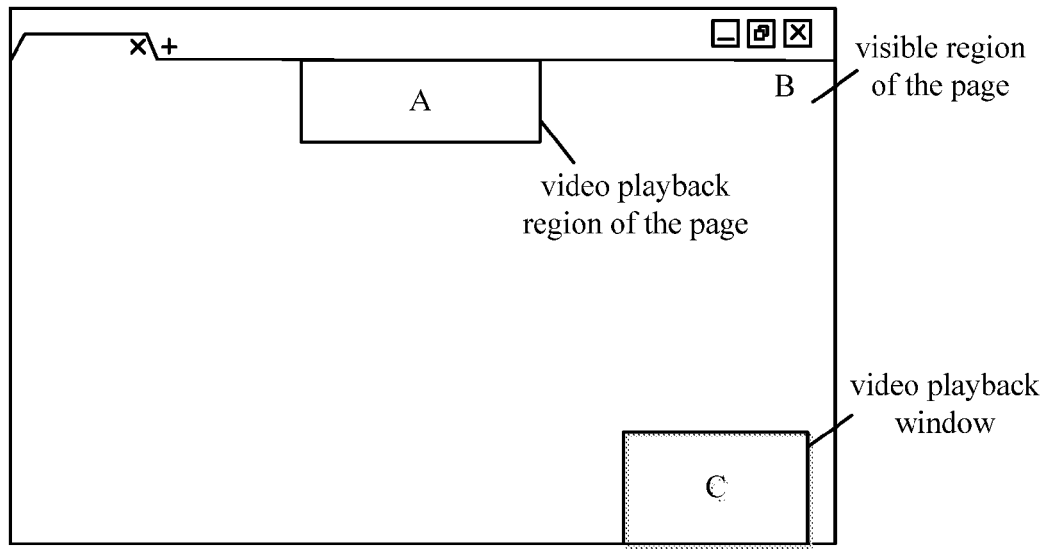

For example, as shown in FIG. 3c, based on the above-described FIG. 3a and FIG. 3b, the electronic device suspends the playback of the video on the page, creates the video playback window in the lower right corner of the screen (the embodiment is not limited to the lower right corner of the screen) based on the generated first instruction, synchronizes the video playback window with the first progress of the playback of the video on the page, and continues playing the video on the video playback window from the first progress.

Figure 4B:
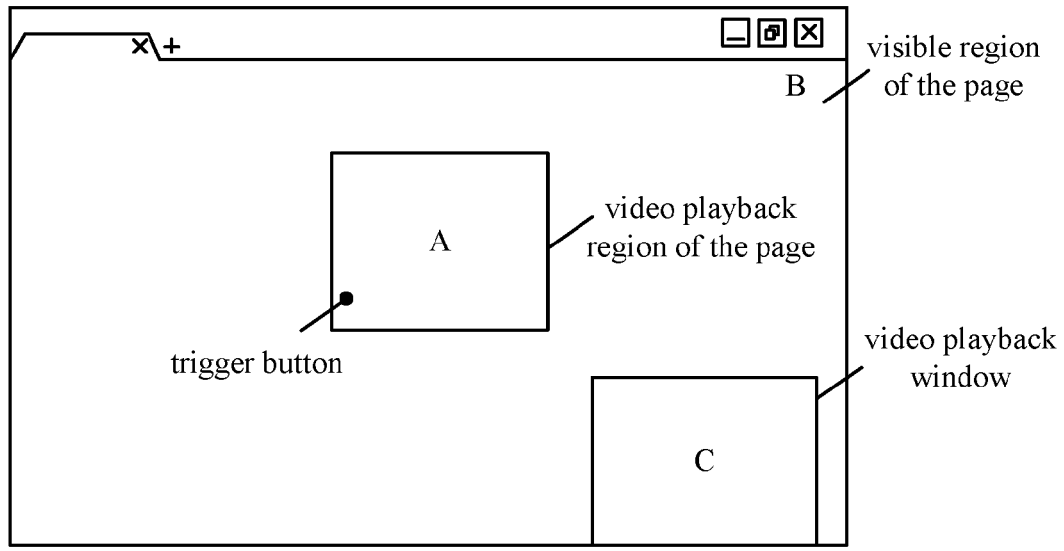

For another example, as shown in FIG. 4b, based on the above-described FIG. 4a, the electronic device suspends the playback of the video on the page, creates the video playback window in the lower right corner of the screen (the embodiment is not limited to the lower right corner of the screen) based on the generated first instruction, synchronizes the video playback window with the first progress of the playback of the video on the page, and continues playing the video on the video playback window from the first progress.

For another example, as shown in FIG. 5b, based on the above-described FIG. 5a, the electronic device suspends the playback of the video on the page 1, creates the video playback window in the lower right corner of the screen (the embodiment is not limited to the lower right corner of the screen) based on the generated first instruction, synchronizes the video playback window with the first progress of the playback of the video on the page 1, and continues playing the video on the video playback window from the first progress.

According to the embodiment of the disclosure, the video playback window is located on the top layer of the display interface of the electronic device, that is, the video playback window covers the overlapped contents displayed on the same region so as to ensure that the video playback on the video playback window is not influenced by other display contents. Although shown in FIG. 5b, the electronic device changes from displaying the content of the page 1 to displaying the content of the page 2, and the created video playback window covers the overlapped contents displayed on the same region as the page 2 so as to ensure that the video is played normally on the video playback window.

In one or more embodiments, after the video playback window is controlled to play the video, the method includes:
  obtaining a second instruction by the electronic device, where the second instruction is configured to instruct a switch from a playback of the video playback window to a playback on the page, and the second instruction includes a URL corresponding to the video played in the video playback window and information of a second progress of the video played in the video playback window; and
  closing the video playback window based on the second instruction, and obtaining corresponding video data based on the URL and the information of the second progress; controlling a page corresponding to the URL to perform the playback of the corresponding video in the video playback region from the second progress where the video playback window is closed.

According to the embodiment of the disclosure, before the second instruction is generated, the video playback window is always in an interface foreground display state. According to some embodiments of the disclosure, after the second instruction is generated, the video playback window is hidden.

The above describes that the first instruction is generated by triggering, when detecting that the video playback region of the page on which the video is being played is removed out of the visible region of the page. Then the second instruction is generated by triggering, and the playback on the video playback window is switched back to the playback on the page, when detecting that the video playback region of the page returns to the visible region of the page; and if it is detected that the video playback region of the page is not in the visible region of the page, that is, the video playback region of the page does not return to the visible region of the page, the video playback window keeps in the interface foreground display state, and the video playback window continues playing the video.

In one or more embodiments, when detecting that the video playback region of the page completely returns to the visible region of the page, the second instruction is generated by triggering, and the playback on the video playback window is switched back to the playback on the page; in one or more embodiments, when detecting that most of the video playback region of the page, such as three quarters, returns to the visible region of the page, the second instruction is generated by triggering, and the playback on the video playback window is switched back to the playback on the page.

In one or more embodiments, the electronic device may trigger generating the second instruction, when detecting that the page corresponding to the URL is in the interface foreground display state, and that the visible region of the page includes a complete video playback region for the playback of the video; or the second instruction is generated by triggering, when detecting that the page corresponding to the URL is in the interface foreground display state, the visible region of the page includes the complete video playback region for the playback of the video, and a second operation of the user is obtained.

That is to say, if the electronic device is playing the video by using the created video playback window, the electronic device may trigger generating the second instruction, when the electronic device detects that the page which the video belongs to is in the interface foreground display state, and that the visible region of the page includes the complete video playback region for the playback of the video; or the electronic device may trigger generating the second instruction, when the electronic device detects that the page which the video belongs to is in the interface foreground display state, the visible region of the page includes the complete video playback region for the playback of the video, and the electronic device obtains the second operation of the user. Herein, the second operation may be that the user clicks a close button on the video playback window.

For example, based on the above-described FIG. 3c, the electronic device may generates the second instruction, when the visible region of the page again includes the complete video playback region by scrolling or sliding the page by the user; or based on the FIG. 3c, the electronic device may generates the second instruction, when the visible region of the page again includes the complete video playback region by scrolling or sliding the page by the user, and the user clicks the close button on the video playback window.

According to the second instruction, the electronic device closes the video playback window, and synchronizes the video playback region on the page with the second progress of the playback of the video in the video playback window; and continues playing the video from the second progress in the video playback region.

For another example, based on the above-described FIG. 4b, the electronic device may generates the second instruction, when the visible region of the page again includes the complete video playback region by scrolling or sliding the page by the user (that is, the video playback region is totally in the visible region of the page); or based on the above-described FIG. 4b, the electronic device may generates the second instruction, when the visible region of the page again includes the complete video playback region by scrolling or sliding the page by the user, and the user clicks the close button on the video playback window.

According to the second instruction, the electronic device closes the video playback window, and synchronizes the video playback region on the page with the second progress of the playback of the video in the video playback window; and continues playing the video from the second progress in the video playback region.

For another example, based on the above-described FIG. 5b, when the user switches a page 2 to a page 1, and scrolls or slides the page 1 to make that the visible region of the page 1 again includes the complete video playback region, the electronic device generates the second instruction; or based on the above-described FIG. 5b, when the user switches the page 2 to the page 1, scrolls or slides the page 1 to make that the visible region of the page 1 again includes the complete video playback region, and clicks the close button in the video playback window, the electronic device generates the second instruction.

According to the second instruction, the electronic device closes the video playback window, and synchronizes the video playback region on the page 1 with the second progress of the playback of the video in the video playback window; and continues playing the video from the second progress in the video playback region.

In one or more embodiments, the electronic device stores complete video data and the URL into a database, when obtaining the complete video data played in the video playback window.

Before obtaining the first instruction, the method further includes:

obtaining a video playback instruction of the page by the electronic device; querying the database based on the URL in the video playback instruction by the electronic device; and invoking the complete data of the video to play the video in the video playback region on the page by the electronic device, when the matched complete data of the video is queried and obtained.

In one or more embodiments, if the first instruction is obtained after the complete data of the video are invoked to play the video on the video playback region of the page, the first instruction also includes a store address of the complete video data in the database;

Correspondingly, the controlling the video playback window to play the corresponding video based on the URL and the information of the first progress includes: obtaining the corresponding video data from the database storage address based on the URL and the information of first progress, and controlling the video playback window to play the corresponding video based on the obtained video data.

That is to say, if the electronic device saves the complete data of the video played in the video playback window, the electronic device firstly queries whether there are matched (i.e., URL matched) complete video data in the database, each time when the electronic device obtains a video playback instruction corresponding to a certain page; in a case that there are matched complete video data in the database, the electric device directly invokes the complete video data in the database to play the video, without obtaining the video data via the web server-side again, which saves the data traffic and also saves the transmission resources; in a case that there are not matched complete video data in the database, the electronic device obtains video data corresponding to the URL via the web server-side.

In addition, if the playback of the video on a page is performed by invoking the complete video data in the database, a generated first instruction further includes a database storage address of the complete video data; so the electronic device may obtain corresponding video data from the database storage address based on the URL and the information of the first progress, after creating the video playback window, and play the video from the first progress without obtaining video data corresponding to the URL from the web server-side.

Besides, after the video playback window continues playing the video from the first progress, if the second instruction is obtained, the second instruction also includes the database storage address of the complete video data; so the electronic device may obtain corresponding video data from the database storage address based on the URL and the information of the second progress, when closing the video playback window, continue playing the video from the second progress by the video playback region on the page, without obtaining video data corresponding to the URL from the web server-side In one or more embodiments, after creating the video playback window based on the first instruction, the electronic device may obtain a third instruction. The third instruction is configured to instruct a position change of the video playback window, which includes at least displacement information. The electronic device changes the position of the video playback window based on the displacement information in the third instruction. That is to say, a user may drag the video playback window within a page region which is visible to the user, so as to change the position of the video playback window within the page region which is visible to the user, thus avoiding that the page content is covered by the video playback window stopping at a fixed position.

Figure 2:
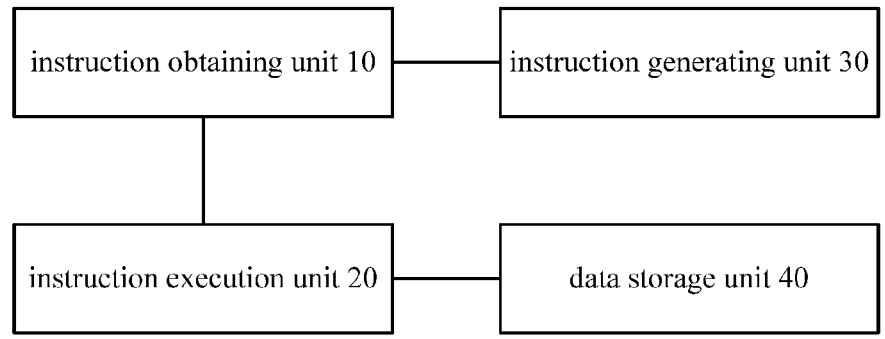
FIG. 2 is a structural schematic diagram of a system for video processing according to an embodiment of the disclosure.

FIG. 2 shows a system for video processing provided according to an embodiment of the disclosure. The system includes an instruction obtaining unit 10 and an instruction execution unit 20.

The instruction obtaining unit 10 is configured to obtain a first instruction, where the first instruction is used for creating a video playback window, and includes at least a URL of a video playback page and information of a first progress.

The instruction execution unit 20 is configured to suspend the playback of the video on the page at the first progress, create the video playback window based on the first instruction, and control the video playback window to play the video based on the URL and the information of the first progress.

In one or more embodiments, the instruction execution unit 20 is further configured to control the video playback window to play the video from the first progress where the playback of the video on the page is suspended, based on the URL and the information of the first progress.

In one or more embodiments, the system further includes an instruction generating unit 30, configured to:
generate the first instruction, when detecting that a video playback region of the page on which the video is being played is removed out of a visible region of the page; or
generate the first instruction, when detecting that a user performs a first operation on the page where the video is being played; or
generate the first instruction, when detecting a change of the page where the video is being played from the interface foreground display state to a non-interface foreground display state.

According to the embodiment of the disclosure, the first progress refers to a progress of the video played on the page when generating the first instruction.

According to one or more embodiments, when the video is played by the page, if the instruction generating unit 30 detects that the video playback region of the page is removed out of the visible region of the page, the instruction generating unit 30 triggers generating the first instruction; or
when the video is played by the page, if the instruction generating unit 30 detects that the user performs the first operation on the page, the instruction generating unit 30 triggers generating the first instruction, where the first operation may be the user's clicking an operation button to trigger generating the first instruction; or
when the video is played by the page, if the instruction generating unit 30 detects that a state of the page is changed from the interface foreground display state to the non-interface foreground display state, the instruction generating unit 30 triggers generating the first instruction. The interface foreground display state of the page refers to that what a display screen of the electronic device currently displays is the content of the page; the non-interface foreground display state refers to that what the display screen of the electronic device currently displays is not the content of the page.

According to an embodiment of the disclosure, the video playback window is different from a playback window generated by a native video tag in the page, and is also different from an ordinary flash playback window. The video playback window is different from the video playback window on the page and exists as an independent video playback pattern or an independent video player; after being generated, the video playback window may not influence an operation on the original video playback page and an operation of creating a new browsing page, hence achieving an effect that the user may watch the video, while browsing the page or performing other operations on the page.

In one or more embodiments, the instruction obtaining unit 10 is further configured to obtain a second instruction, after obtaining the first instruction, where the second instruction is used to instruct a switch from a playback on the video playback window to a playback on the page, and includes a URL corresponding to the video played on the video playback window and information of a second progress of the video played in the video playback window.

The instruction execution unit 20 is further configured to close the video playback window based on the second instruction, and obtain the corresponding video data based on the URL and the information of the second progress; and control a video playback region of the page corresponding to the URL to play the video from the second progress where the video playback window is closed, based on the obtained video data.

According to some embodiments of the disclosure, before the second instruction is generated, the video playback window is always in the interface foreground display state.

In one or more embodiments, the instruction generating unit 30 is further configured to trigger generating the second instruction, when detecting that the video playback region of the page returns to the visible region of the page, after the first instruction is generated. If the result detected by the instruction generating unit 30 is that the video playback region of the page is not in the visible region of the page (that is, the video playback region of the page does not return to the visible region of the page), the instruction execution unit 20 makes the video playback window in the interface foreground display state to continue playing the video.

In one or more embodiments, the instruction generating unit 30 is further configured to trigger generating the second instruction, when detecting that the video playback region of the page completely returns to the visible region of the page; in one or more embodiments, the instruction generating unit 30 is further configured to trigger generating the second instruction, when detecting that three quarters of the video playback region of the page returns to the visible region of the page.

In one or more embodiments, the instruction generating unit 30 is further configured to:
  trigger generating the second instruction, when detecting that the page corresponding to the URL is in the interface foreground display state, and that the visible region of the page includes the complete video playback region used to play the video; or
  generate the second instruction, when detecting that the page corresponding to the URL is in the interface foreground display state, the visible region of the page includes the complete video playback region for the playback of the video, and a second operation of the user is obtained.

That is to say, if the electronic device is playing the video by using the created video playback window, the instruction generating unit 30 of the electronic device may trigger generating the second instruction, when detecting that the page which the video belongs to is in the interface foreground display state and the visible region of the page includes the complete video playback region; or the instruction generating unit 30 of the electronic device may trigger generating the second instruction, when detecting that the page which the video belongs to is in the interface foreground display state, the visible region of the page includes the complete video playback region for the playback of the video, and the second operation of the user is obtained. Wherein, the second operation may be, but not limited to, the user clicking a close button on the video playback window.

In one or more embodiments, the system further includes a data storage unit 40, which is configured to store the complete video data of the video played in the video playback window and a corresponding URL in a database, when the instruction execution unit 20 obtains the complete video data of the video.

In one or more embodiments, the instruction obtaining unit 10 is further configured to obtain a video playback instruction of the page, before obtaining the first instruction.

The instruction execution unit 20 is further configured to query the database based on the URL in the video playback instruction, and when matched complete video data are queried, invoke the complete video data to play the video on the video playback region of the page.

In one or more embodiments, if the first instruction is obtained after complete video data are invoked to play the video on the video playback region of the page, the first instruction further includes a database storage address of the complete video data.

Correspondingly, the instruction execution unit 20 is further configured to obtain the corresponding video data from the database storage address, according to the URL and the information of the first progress, and control the video playback window to play the corresponding video, according to the obtained video data.

That is to say, if the electronic device saves the complete data of the video played in the video playback window, the electronic device firstly queries whether there are matched (i.e., URL matched) complete video data in the database, each time when the electronic device obtains a video playback instruction corresponding to a certain page; in a case that there are matched complete video data in the database, the electronic device directly invokes the complete video data in the database to play the video, without obtaining the video data via a web server-side again, which saves the data traffic and also saves the transmission resources; in a case that there are not matched complete video data in the database, the electronic device obtains the video data corresponding to the URL via the web server-side.

In addition, if the playback of the video is performed by invoking the complete video data in the database, the generated first instruction further includes a database storage address of the complete video data; so the electronic device may obtain corresponding video data from the database storage address based on the URL and the information of the first progress, after creating the video playback window, and play the video from the first progress, without obtaining video data corresponding to the URL from the web server-side.

Moreover, after the video playback window continues playing the video from the first progress, if the second instruction is obtained, the second instruction also includes the database storage address of the complete video data; so the electronic device may obtain corresponding video data from the database storage address based on the URL and the information of the second progress, when closing the video playback window, and play the video from the second progress by the video playback region of the page, without obtaining video data corresponding to the URL from the web server-side.

In one or more embodiments, the instruction obtaining unit 10 is further configured to obtain a third instruction after the instruction execution unit 20 creates the video playback window. The third instruction is configured to instruct a position change of the video playback window, and includes at least displacement information.

The instruction execution unit 20 is further configured to correspondingly change a position of the video playback window based on the displacement information in the third instruction.

In one or more embodiments, the instruction generating unit 30 is further configured to trigger generating the third instruction, when an operation that the user drags the video playback window is obtained, and obtain the corresponding displacement information based on a drag distance of the user.

That is to say, the user may drag the video playback window within a page region which is visible to the user so as to change a position of the video playback window within the page region which is visible to the user, thus avoiding that the page content is covered by the video playback window stopping at a fixed position.

It should be noted that, the system for video processing in the disclosure can be applied to an electronic device with a browser. The above instruction obtaining unit 10, instruction execution unit 20 and instruction generating unit 30 may be implemented by a central processing unit (CPU), a microprocessing unit (MPU) and a digital signal processor (DSP) or a field programmable gate array (FPGA) of the electronic device; and the data storage unit 40 may be implemented by a memory of the electronic device. For example, program instructions corresponding to the instruction obtaining unit 10, the instruction execution unit 20, the instruction generating unit 30 and the data storage unit 40 may be stored in the memory of the electronic device, and be executed by one or more of the above processors so as to implement the method for video processing described in the disclosure.

Hereafter a method and a system for video processing according to embodiments of the disclosure are further described below in detail in conjunction with specific application scenarios.

Reference is made to FIG. 3*a* to FIG. 3*c*. As shown in FIG. 3*a*, in a case that a user clicks to play a video on a page when browsing the page, a playback region on which the video is played on the page is shown as a region A in the figure, and a region B in the figure is a visible region of the page, namely a page region which is visible for the user via a display screen of the electronic device. As shown in FIG. 3*b*, when the user hopes to browse other contents (such as comments of the video and relevant information of the video) on the page, while watching the video, the user scrolls or slides the page, so that the region A for playing the video on the page gradually is removed out of the visible region B of the page, that is, the visible region B of the page no longer includes the complete playback region A; in this case, the electronic device triggers generating the first instruction for creating a video playback window.

The electronic device suspends the playback of the video on the page based on the first instruction, creates the video playback window in the lower right corner of the screen (the embodiment is not limited to the lower right corner of the screen), synchronizes the video playback window with the first progress of the playback of the video on the page, and continues playing the video on the video playback window from the first progress.

Subsequently, the electronic device may generate the second instruction, when the visible region of the page again includes the complete video playback region by scrolling or sliding the page by the user; the electronic device closes the video playback window, synchronizes the video playback region in the page with the second progress of the playback of the video on the video playback window, and continues playing the video on the video playback region from the second progress.

Reference is made to FIG. 4*a* to FIG. 4*b*. As shown in FIG. 4*a*, in a case that a user clicks to play a video on a page when browsing the page, a playback region on which the video is played on the page is shown as a region A in the figure, and a region B in the figure is a visible region of the page, namely a page region which is visible for the user via a display screen of the electronic device. The electronic device may trigger generating the first instruction for creating a video playback window, when the user clicks or touches a trigger button on the page. The trigger button is an operation button which is used to create the video playback window on a display interface of the electronic device.

The electronic device suspends the playback of the video on the page based on the first instruction, creates the video playback window in the lower right corner of the screen (the embodiment is not limited to the lower right corner of the screen), based on the generated first instruction, synchronizes the video playback window with the first progress of the playback of the video on the page, and continues playing the video on the video playback window from the first progress.

Subsequently, the electronic device generates the second instruction, when the visible region of the page again includes the complete video playback region by scrolling or sliding the page by the user and the user clicks the close button in the video playback window; based on the second instruction, the electronic device closes the video playback window, synchronizes the video playback region in the page with the second progress of the playback of the video on the video playback window, and continues playing the video on the video playback region from the second progress.

Reference is made to FIG. 5*a* to FIG. 5*b*. As shown in FIG. 5*a*, in a case that a user clicks to play a video on a page 1 when browsing the page, a playback region on which the video is played on the page 1 is shown as a region A in the figure, and a region B1 in the figure is a visible region of the page 1, namely a page region which is visible for the user via a display screen of the electronic device; as shown in FIG. 5*b*, in a case that a user opens a new page 2 when the video is played on the page 1, the content displayed on a screen is changed from the content of the page 1 to the content of the page 2, where a region B2 in the figure is a visible region of the page 2; in this case, the electronic device may trigger generating a first instruction for creating the video playback window.

The electronic device suspends the playback of the video on the page 1 based on the first instruction, creates the video playback window in the lower right corner of the screen (the embodiment is not limited to the lower right corner of the screen), based on the generated first instruction, synchronizes the video playback window with the first progress of the playback of the video on the page 1, and continues playing the video on the video playback window from the first progress.

Subsequently, when the user switches the page 2 to the page 1, and scrolls or slides the page 1 so that the visible region of the page 1 again includes the complete video playback region, the electronic device generates the second instruction; or based on the above-described FIG. 5*b*, when the user switches the page 2 to the page 1, scrolls or slides the page 1 so that the visible region of the page 1 again includes the complete video playback region, and clicks on the close button in the video playback window, the electronic device generates the second instruction. The electric device closes the video playback window based on the second instruction, synchronizes the video playback region in the page 1 with the second progress of the playback of the video on the video playback window, and continues playing the video on the video playback region from the second progress.

In addition, the video playback window in embodiments of the disclosure also supports a full-screen playback. When the user triggers an operation of the full-screen playback, the electronic device performs the operation of the full-screen playback on the video playback window by hiding control functions of a native full-screen playback window of a page and using custom control functions of the video playback window.

In embodiments of the disclosure, the following advanced functions may be added to the control functions of the video playback window: a gesture control to volume and brightness (like controlling a volume or a brightness via an up-down gesture), a playback progress (like controlling the playback progress via a left-right slide gesture), downloading a video, collecting a video and displaying drama series, so as to enrich the control functions of the video playback window and improve the user's experience.

In conclusion, according to embodiments of the disclosure, in a case that the video playback region on the page is not suitable for continuing playing the video, an independent video playback window is created for continuing playing the video, hence ensuring that the user's watching the video is not interrupted; and continuing playing the video via the video playback window may not influence an operation on the original video playback page and an operation of creating a new browsing page, hence achieving an effect that the user may watch the video, while browsing the page or performing other operations on the page. In addition, the video playback window in the embodiments of the disclosure supports a position change in a page region visible to the user, thus avoiding that the video playback window stopping at a fixed position covers the page content. The video playback window is different from a video playback window of a page, exists independently, and can integrate abundant advanced functions which cannot achieved by the video playback window of the page to improve the user's experience.

A computer readable storage medium is further provided according to embodiments of the disclosure. The storage medium includes computer executable instructions which cause a processor to implement the method for video processing in the above-described embodiments of the disclosure when executed by the processor.

It should be understood by the person skilled in the art, embodiments of the disclosure may provide a method, a system, or a computer program product. Therefore, the disclosure may be implemented in a form of hardware embodiment, software embodiment, or a combination of hardware embodiment and software embodiment. Besides, the disclosure can be implemented in a form of a computer program product which are implemented on one or more computer readable storage media (including but not limited to a disk storage and an optical storage) having computer usable program code.

The disclosure is described referring to a flow chart and/or a block diagram of the method, the device (system) and the computer program product according to embodiments of the disclosure. It should be understood that each of flows and/or blocks in the flow chart and/or block diagram and combination of flows and/or blocks in the flow chart and/or block diagram can be implemented by computer program instructions. The computer program instructions can be provided to a general-purpose computer, a special-purpose computer, an embedded processor or a processor of other programmable data processing device to generate a machine, so that instructions executed in computers or processors of other programmable data processing device generate a device which is used to achieve specified functions in one or more flows of the flow chart and/or one or more blocks of block diagram.

The computer program instructions may also be stored in a computer readable storage medium which can guide computers or other programmable data processing devices to operate in a particular way, so that instructions stored in the computer readable storage medium generate an article of manufacture including an instruction device. The instruction device achieves specified functions in one or more flows of the flow chart and/or one or more blocks of block diagram.

The computer program instructions may also be loaded to computers or other programmable data processing devices so that a series of operation steps are executed in computers or other programmable data processing devices to generate a process realized by computers, therefore, instructions executed in computers or other programmable data processing device provides steps of specified functions in one or more flows of the flow chart and/or one or more blocks of block diagram.

The foregoing embodiments are only preferred embodiments of the disclosure and are not meant to limit the protection scope of the disclosure.

The invention claimed is:

1. A video processing method running in an electronic device, the electronic device comprising a memory, one or more processors and program instructions stored in the memory and executed by the one or more processors, the method comprising:

providing a display interface, where pages are displayed on the display interface, and the pages comprises a page having a video playback region;

playing a video on the page having the video playback region, and obtaining a first instruction during playing the video, wherein the first instruction is configured to create a video playback window on the display interface, and comprises at least a uniform resource locator URL of the page on which the video is played;

creating the video playback window based on the first instruction;

suspending a playback of the video on the page;

recording a progress of the video where the playback of the video is suspended as a first progress; and playing the video on the video playback window by using the first progress as a starting point for playing the video, based on the URL, wherein when the video is played on the video playback region on the page, the method further comprises:

detecting whether the video playback region is within a visible region of the page, and keeping the video playback window playing the video, in a case that it is detected that the video playback region is not within the visible region of the page.

2. The method according to claim 1, wherein an area of the video playback window is smaller than the page.

3. The method according to claim 1, wherein the pages further comprise a web page, and when a user browses the web page, the web page and the video playback window are simultaneously in an interface foreground display state, wherein during playing the video on the video playback window, if the user browses the page having the video playback region, and the video playback region is out of the visible region of the page, the page having the video playback region and the video playback window are simultaneously in the interface foreground display state.

4. The method according to claim 1, comprising:

generating the first instruction, when detecting that the video playback region of the page on which the video is being played is removed out of the visible region of the page.

5. The method according to claim 1, comprising:

generating the first instruction, when detecting that a user performs a first operation on the page where the video is being played.

6. The method according to claim 1, comprising:

generating the first instruction, when detecting that the page where the video is being played is switched from an interface foreground display state to a non-interface foreground display state.

7. The method according to claim 1, wherein after controlling the video playback window to play the video, the method further comprises:

obtaining a second instruction, wherein the second instruction is configured to instruct a switch from a playback of the video on the video playback window to a playback of the video on the page and comprises at least information of a second progress of the video played on the video playback window; and closing the video playback window and controlling the page to play the video on the video playback region from the second progress, based on the second instruction.

8. The method according to claim 7, further comprising:

generating the second instruction, when detecting that the page is in an interface foreground display state, and that the visible region of the page includes a complete video playback region for playing the video.

9. The method according to claim 7, further comprising: generating the second instruction, when detecting that the page is in an interface foreground display state, the visible region of the page includes a complete video playback region for playing the video, and a second operation of the user is obtained.

10. The method according to claim 1, further comprising: associating complete video data of the video with the URL and storing the complete video data and the URL in a database after obtaining the complete video data of the video.

11. The method according to claim 10, wherein before the first instruction is obtained, the method further comprises: obtaining a video playback instruction of the page, querying the database based on the URL in the video playback instruction, and when matched complete video data are queried, invoking the complete video data to play the video on the video playback region of the page.

12. The method according to claim 11, wherein the first instruction further comprises a database storage address of the complete video data; and
the playing the video on the video playback window by using the first progress as the starting point for playing the video based on the URL comprises: obtaining the corresponding video data from the database storage address based on the URL, and controlling the video playback window to play the video from the first progress based on the obtained video data.

13. An electronic device, comprising:
a memory; and
one or more processors,
wherein the memory stores program instructions, and when the program instructions are executed by the processor, the electronic device is configured to perform the following operations:
providing a display interface, where pages are displayed on the display interface, and the pages comprises a page having a video playback region;
playing a video on the page having the video playback region, and obtaining a first instruction during playing the video, wherein the first instruction is configured to create a video playback window on the display interface, and comprises at least a uniform resource locator URL of the page on which the video is played;
creating the video playback window according to the first instruction;
suspending a playback of the video on the page;
recording a progress of the video where the playback of the video is suspended as a first progress; and
playing the video on the video playback window by using the first progress as a starting point for playing the video, based on the URL, and
wherein when the video is played on the video playback region of the page, the operations comprise:
detecting whether the video playback region is within a visible region of the page; and
keeping the video playback window playing the video, in a case that it is detected that the video playback region is not within the visible region of the page.

14. The electronic device according to claim 13, wherein the page further comprises a web page, and when a user browses the web page, the web page and the video playback window are simultaneously in an interface foreground display state,
wherein during playing the video on the video playback window, if the user browses the page having the video playback region, and the video playback region is out of the visible region of the page, the page having the video playback region and the video playback window are simultaneously in the interface foreground display state.

15. The electronic device according to claim 13, wherein the operations comprises:
generating the first instruction, when detecting that the video playback region of the page on which the video is being played is removed out of the visible region of the page.

16. The electronic device according to claim 13, wherein the operations comprises:
generating the first instruction, when detecting that a user performs a first operation on the page where the video is being played.

17. The electronic device according to claim 13, wherein the operations comprises:
generating the first instruction, when detecting that a state of the page where the video is being played is switched from an interface foreground display state to a non-interface foreground display state.

18. The electronic device according to claim 13, wherein the operations comprises:
obtaining a second instruction; wherein the second instruction is configured to instruct a switch from a playback on the video playback window to a playback on the page, and comprises at least information of a second progress of the video played on the video playback window; and
closing the video playback window and controlling the page to play the video on the video playback region from the second progress, based on the second instruction.

19. A non-transitory computer readable storage medium, wherein the storage medium comprises computer executable instructions, and when the instructions are executed by a processor, the following steps are performed by the processor:
providing a display interface, where pages are displayed on the display interface, and the pages comprise a page having a video playback region;
playing a video on the page having the video playback region, and obtaining a first instruction during playing the video, wherein the first instruction is configured to create a video playback window on the display interface, and comprises at least a uniform resource locator URL of the page on which the video is played;
creating the video playback window according to the first instruction;
suspending a playback of the video on the page;
recording a progress of the video where the playback of the video is suspended as a first progress; and
playing the video on the video playback window by using the first progress as a starting point for playing the video, based on the URL,
wherein when the video is played on the video playback region on the page, the steps further comprise:
detecting whether the video playback region is within a visible region of the page, and keeping the video playback window playing the video, in a case that it is detected that the video playback region is not within the visible region of the page.

\* \* \* \* \*